United States Patent
Lee et al.

(10) Patent No.: US 8,675,584 B2
(45) Date of Patent: Mar. 18, 2014

(54) METHOD OF CONFIGURING RADIO CONNECTION IN MULTI-CARRIER SYSTEM

(75) Inventors: Young Dae Lee, Anyang-si (KR); Sung Duck Chun, Anyang-si (KR); Seung June Yi, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 13/255,052

(22) PCT Filed: Apr. 20, 2010

(86) PCT No.: PCT/KR2010/002458
§ 371 (c)(1),
(2), (4) Date: Sep. 6, 2011

(87) PCT Pub. No.: WO2010/123252
PCT Pub. Date: Oct. 28, 2010

(65) Prior Publication Data
US 2011/0317552 A1 Dec. 29, 2011

Related U.S. Application Data

(60) Provisional application No. 61/171,440, filed on Apr. 21, 2009.

(30) Foreign Application Priority Data

Apr. 15, 2010 (KR) .................. 10-2010-0034979

(51) Int. Cl.
*H04W 4/00* (2009.01)

(52) U.S. Cl.
USPC ........................................ 370/329

(58) Field of Classification Search
USPC ......... 370/328, 310, 329, 315, 331, 332, 333, 370/310.2, 341, 338
See application file for complete search history.

(56) References Cited

U.S. PATENT DOCUMENTS

| | | | |
|---|---|---|---|
| 6,226,521 B1 * | 5/2001 | Liu et al. ................. | 455/453 |
| 7,092,353 B2 * | 8/2006 | Laroia et al. ............. | 370/210 |
| 2006/0034204 A1 | 2/2006 | Lee et al. | |
| 2009/0005095 A1 | 1/2009 | Chun et al. | |
| 2011/0080825 A1 * | 4/2011 | Dimou et al. ............ | 370/216 |
| 2011/0096671 A1 * | 4/2011 | Lindstrom et al. ........ | 370/242 |

FOREIGN PATENT DOCUMENTS

| | | |
|---|---|---|
| KR | 10-2007-0121505 A | 12/2007 |
| KR | 10-2009-0003754 A | 1/2009 |

* cited by examiner

*Primary Examiner* — Anh Ngoc Nguyen
(74) *Attorney, Agent, or Firm* — Birch, Stewart, Kolasch & Birch, LLP

(57) ABSTRACT

A method of configuring a radio connection by a mobile station (MS) in a multi-carrier system includes receiving carrier aggregation information on a plurality of aggregated carriers from a base station (BS), performing a radio connection to the BS by using at least one first carrier among the plurality of aggregated carriers, and reestablishing a radio connection to the BS by using a second carrier when an error occurs in the radio connection.

8 Claims, 5 Drawing Sheets

METHOD OF CONFIGURING RADIO CONNECTION IN MULTI-CARRIER SYSTEM

This application is the National Phase of PCT/KR2010/002458 filed on Apr. 20, 2010, which claims priority under 35 U.S.C. 119(e) to U.S. Provisional Application No. 61/171,440 filed on Apr. 21, 2009 and under 35 U.S.C. 119(a) to Patent Application No. 10-2010-0034979 filed in Republic of Korea on Apr. 15, 2010, all of which are hereby expressly incorporated by reference into the present application.

TECHNICAL FIELD

The present invention relates to wireless communication and, more particularly, to a method of configuring radio connection in a multi-carrier system.

BACKGROUND ART

Wireless communication systems are widely spread all over the world to provide various types of communication services such as voice or data communication. In general, a wireless communication system is a multiple access system capable of supporting communication with multiple users by sharing available radio resources. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc.

In a wireless communication system, one carrier is considered in general even if a bandwidth is differently set between an uplink and a downlink. In 3rd generation partnership project (3GPP) long term evolution (LTE), one carrier constitutes each of the uplinks and the downlinks on the basis of a single carrier, and the bandwidth of the uplink is symmetrical to the bandwidth of the downlink. However, except for some areas of the world, it is not easy to allocate frequencies of wide bandwidths. Therefore, as a technique for effectively using fragmented small bands, a spectrum aggregation technique is being developed to obtain the same effect as when a band of a logically wide bandwidth is used by physically aggregating a plurality of bands in a frequency domain. The spectrum aggregation includes a technique for supporting a system bandwidth of 100 mega Hertz (MHz) by using multiple carriers even if, for example, the 3GPP LTE supports a bandwidth of up to 20 MHz, and a technique for allocating an asymmetric bandwidth between the uplink and the downlink.

A mobile station (MS) may be in a radio resource control (RRC) connected mode or in an idle mode. When the MS is in the RRC connected mode, a radio link between the MS and the BS is connected. However, when a channel state deteriorates, out-of-synchronization of a radio link may be generated from a physical layer of the MS. When the out-of-synchronization continues to occur more than a certain number of times, the MS declares a radio link failure (RLF). When the RFL is declared, the MS reselects a cell with good quality and performs RRC connection reestablishment. In reestablishing the RRC connection, the MS, supporting a multi-carrier aggregation, is supposed to reestablish a cell regardless of a configuration of carrier aggregation. Thus, if the reselected cell does not belong to the carrier aggregation, a problem may arise in that the service transmitted and received by the MS is deferred or interrupted due to the RLF. Therefore, a method of configuring a radio connection in a multi-carrier system is required.

DISCLOSURE OF INVENTION

Technical Problem

Accordingly, an object of the present invention is to provide a method of configuring a radio connection providing a continuous service in spite of a radio link failure (RLF) in a multi-carrier system.

Solution to Problem

According to an aspect of the present invention, a method of configuring a radio connection by a mobile station (MS) in a multi-carrier system is provided. The method includes receiving carrier aggregation information defining a plurality of aggregated carriers; performing a radio link to a BS by using at least one first carrier from among the plurality of aggregated carriers; and transmitting a signaling to the BS by using a second carrier, in the event of a failure of the radio link; wherein the second carrier is from among the plurality of aggregated carriers.

It will be appreciated that the order of steps of the claimed method is not critical. For example the carrier aggregation information may be received by the MS after performing the radio link to a BS or before performing the radio link to the BS.

According to a second aspect of the present invention, a method of configuring a radio connection by a base station (BS) in a multi-carrier system is provided. The method includes transmitting carrier aggregation information defining a plurality of aggregated carriers to a mobile station (MS); and receiving signaling via a second carrier from among the plurality of aggregated carriers in the event of an error in a first radio connection using a first carrier from among the plurality of aggregated carriers; wherein the second carrier is from among the plurality of aggregated carriers.

A third aspect of the invention provides a user equipment for configuring a radio connection to a base station in a multi-carrier system, the user equipment comprising: a transceiver for receiving carrier aggregation information defining a plurality of aggregated carriers; a processor for performing a radio link to a BS by using at least one first carrier from among the plurality of aggregated carriers; the transmitter being operable to transmit a signalling to the BS by using a second carrier, in the event of a failure of the radio link; wherein the second carrier is from among the plurality of aggregated carriers.

A fourth aspect of the invention provides a base station for configuring a radio connection with a mobile station (MS) in a multi-carrier system, the base station comprising: means for providing carrier aggregation information defining a plurality of aggregated carriers; a transceiver for transmitting the carrier aggregation information to a mobile station (MS) and for receiving signaling via a second carrier from among the plurality of aggregated carriers in the event of an error in a first radio connection using a first carrier from among the plurality of aggregated carriers wherein the second carrier is from among the plurality of aggregated carriers.

In embodiments of the invention:
  the transmission of a signaling may be for reestablishing a radio connection via the second carrier.
  the signaling is a RLF report for reporting failure of the radio link to the base station.
  the second carrier may be determined based on a priority ranking among the plurality of aggregated carriers.

the priority ranking may be given to each of the plurality of carriers based on the channel state of the respective carrier.

the carrier aggregation information may include information on the priority.

the carrier aggregation information may be received or transmitted via one of a broadcast control channel (BCCH), a dedicated control channel (DCCH) or a common control channel (CCCH).

the second carrier may be randomly determined among the plurality of aggregated carriers.

reestablishing of the radio connection may include transmitting a radio resource control (RRC) connection reestablishment request message to the BS; receiving an RRC connection reestablishment message from the BS; and transmitting an RRC connection reestablishment complete message to the BS.

the RRC connection reestablishment request message may be transmitted or received via an uplink carrier mapped to the second carrier.

the RRC connection reestablishment request message may include an indicator indicating the second carrier.

Advantageous Effects of Invention

In accordance with embodiments of the invention a base station, which has configured carrier aggregation, sets priority levels for a plurality of carriers belonging to the carrier aggregation and informs an MS accordingly, and the MS performs a particular process according to the received priority levels, thus preventing a service delay or interruption.

MODE FOR THE INVENTION

Figure 1:
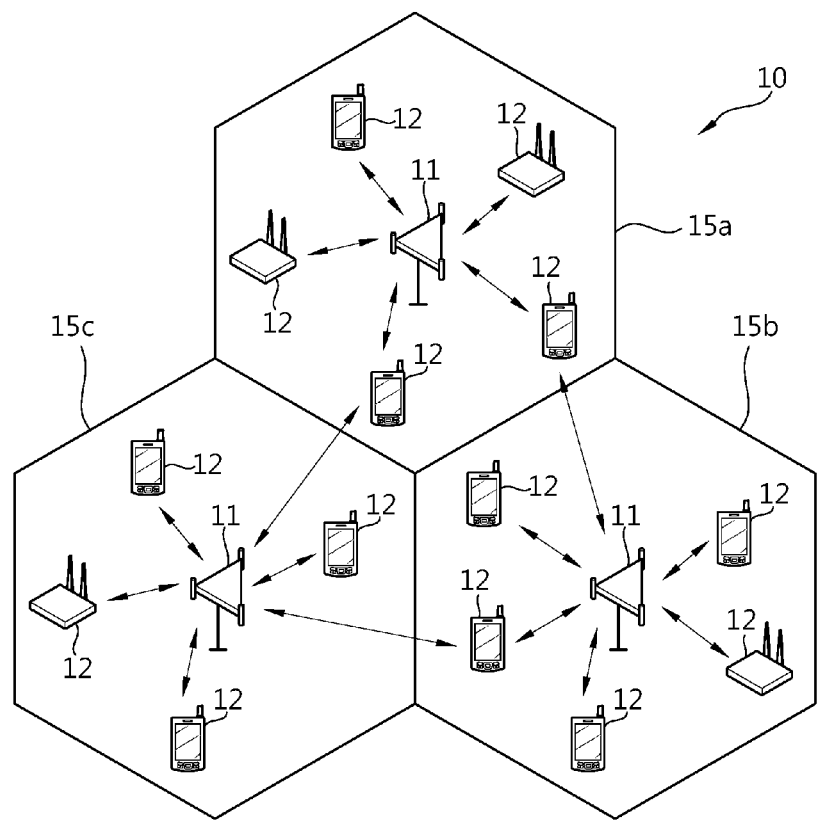
FIG. 1 schematically illustrates a wireless communication system.

FIG. 1 illustrates a wireless communication system. A wireless communication system 10 includes at least one base station (BS) 11. Each base station 11 provides a communication service to a particular geographical area 15a, 15b, or 15c (which are generally called cells). Each cell may be divided into a plurality of areas (which are also called sectors). A mobile station (MS) 12 may be fixed or mobile, and may be referred to by other names such as user equipment (UE), user terminal (UT), subscriber station (SS), wireless device, personal digital assistant (PDA), wireless modem, handheld device, etc. The BS 11 generally refers to a fixed station that communicates with the MS 12 and may be called by other names such as evolved-node B (eNB), base transceiver system (BTS), access point (AP), etc. Downlink (DL) refers to communication from the BS 11 to the MS 12, and uplink (UL) refers to communication from the MS 12 to the BS 11. In the downlink, a transmitter may be a part of the BS 11 and a receiver may be a part of the MS 12. In the uplink, a transmitter may be a part of the MS 12 and a receiver may be a part of the BS 11.

Spectrum aggregation (or bandwidth aggregation or a carrier aggregation) supports a plurality of carriers. A carrier is defined by a bandwidth and a center frequency. The spectrum aggregation is adopted to support increasing throughput, prevent an increase in a cost due to an introduction of a wideband radio frequency (RF) element, and guarantee compatibility with an existing system. For example, if four carriers are assigned as granularity of a carrier unit having a 5 MHz bandwidth, a maximum bandwidth of 20 MHz can be supported.

Spectrum aggregation may be divided into a contiguous spectrum aggregation and a non-contiguous spectrum aggregation. Contiguous spectrum aggregation uses contiguous carriers and the non-contiguous spectrum aggregation uses discontiguous carriers. The number of aggregated carriers may be different in uplink and downlink. When the number of downlink carriers and that of uplink carriers are equal, the aggregation is referred to as symmetric aggregation, and when the numbers are different, the aggregation is referred to as asymmetric aggregation.

The size (i.e., the bandwidth) of aggregated multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

In the following description, a multi-carrier system refers to a system supporting multiple carriers based on spectrum aggregation. Contiguous spectrum aggregation and/or non-continuous spectrum aggregation may be used in the multi-carrier system, and in addition, either symmetrical aggregation or asymmetrical aggregation may be used.

Figure 2:
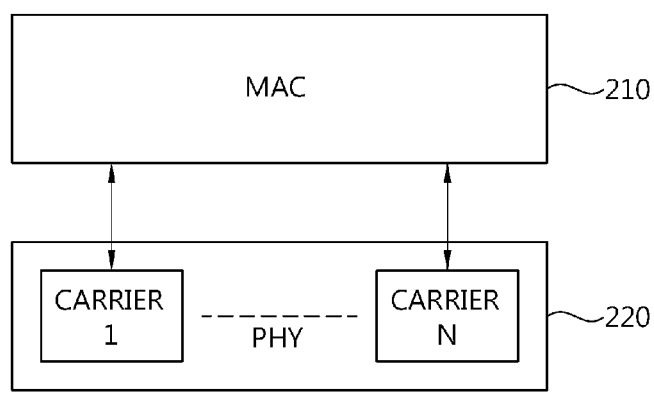
FIG. 2 illustrates an example of a protocol structure for supporting multiple carriers.

FIG. 2 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), as well as hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Figure 3:
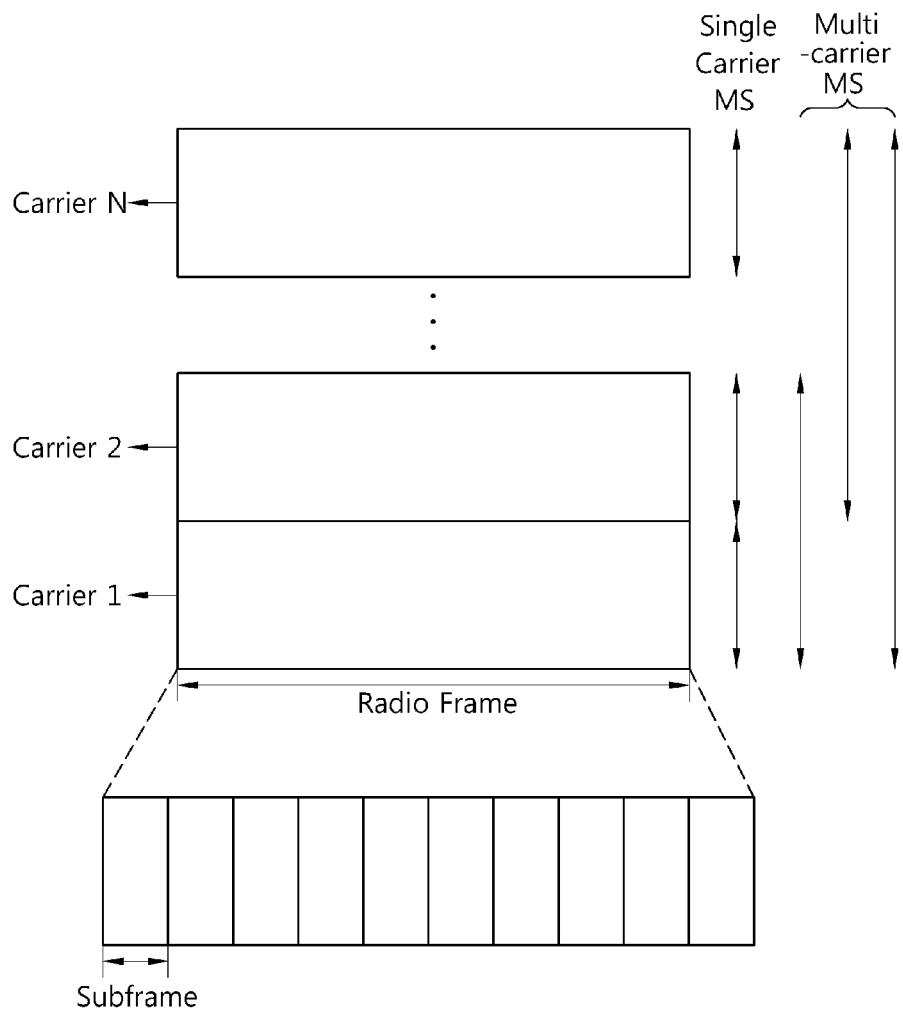
FIG. 3 schematically illustrates an example of a frame structure for operating multiple carriers.

FIG. 3 illustrates an example of a frame structure for operating multiple carriers. A radio frame includes 10 subframes. Each carrier may have its own control channel, i.e. PDCCH. Some carriers may have only a portion of the SFH. Multiple carriers may be or may not be contiguous to each other. An MS may support one or more carriers according to its capability.

Carriers may be divided into a fully configured carrier and a partially configured carrier depending on their directionality. A fully configured carrier refers to a bidirectional carrier that can transmit and/or receive every control signal and data, and the partially configured carrier refers to a unidirectional carrier that can transmit only downlink data. A partially configured carrier may be largely used for an MBS (Multicast and Broadcast Service) and/or an SFN (Single Frequency Network). A fully configured carrier is a standalone carrier for which all control channels including synchronization, broadcast, multicast and unicast control signaling are configured. The partially configured carrier is a carrier configured for downlink only transmission in TDD or a downlink carrier without paired UL carrier in FDD mode.

Carriers may be divided into a primary carrier and a secondary carrier depending on whether they are activated. The primary carrier refers to a carrier that is constantly activated, and the secondary carrier refers to a carrier that is activated or deactivated according to particular conditions. Activation means that transmission or reception of traffic data is performed or traffic data is ready for its transmission or reception. Deactivation means that transmission or reception of traffic data is not permitted. In the deactivation mode, measurement can be made or minimum information can be transmitted or received. The MS uses only a single primary carrier or one or more secondary carriers along with the primary carrier. The MS may be assigned the primary carrier and/or the second carriers by the BS. A primary carrier is a carrier used by a BS to exchange traffic and PHY/MAC control signaling (e.g., MAC control messages) with an MS. Secondary carriers are additional carriers which the MS may use for traffic, only per BS's specific commands and rules received on the primary carrier. The primary carrier may be a fully configured carrier, by which major control information is exchanged between the BS and the MS. The secondary carrier may be a fully configured carrier or a partially configured carrier, which is allocated according to a request of the MS or according to an instruction of the BS. The primary carrier may be used for entering of the MS into a network or for an allocation of the secondary carrier. The primary carrier may be selected from among fully configured carriers, rather than being fixed to a particular carrier. A carrier set as the secondary carrier may be changed to a primary carrier.

Figure 4:
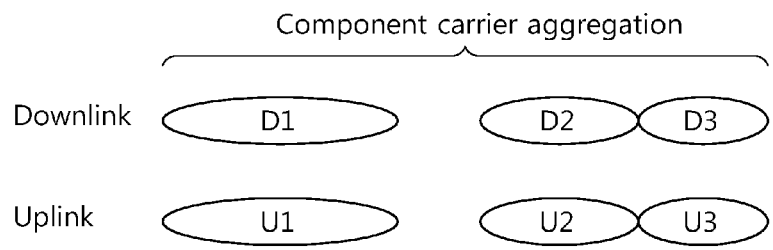
FIG. 4 shows a mapping relation between a downlink carrier and an uplink carrier in a multiple carrier system according to the present invention.

FIG. 4 shows a mapping relation between a downlink carrier and an uplink carrier in a multiple carrier system according to the present invention.

Referring to FIG. 4, in a FDD system, downlink carriers are mapped to respective uplink carriers. D1 is mapped to U1, D2 is mapped to U2, and D3 is mapped to U3. A BS can designate D1, D2, and D3 as an aggregation of downlink carriers and U1, U2, and U3 as an aggregation of uplink carriers. A UE checks a correspondence and a mapping relation between the downlink carriers and the uplink carriers on the basis of system information transmitted by a logical channel BCCH or a UE-dedicated RRC message transmitted by a logical channel DCCH. Although the one-to-one mapping relation between the downlink carriers and the uplink carriers is illustrated in FIG. 4, the downlink carriers and the uplink carriers can have a mapping relation of 1:n or n:1 i.e a downlink carrier can be mapped to one or more uplink carriers, and an uplink carrier can be mapped to one or more down link carriers A method of configuring a radio connection according to an exemplary embodiment of the present invention will now be described.

Figure 5:
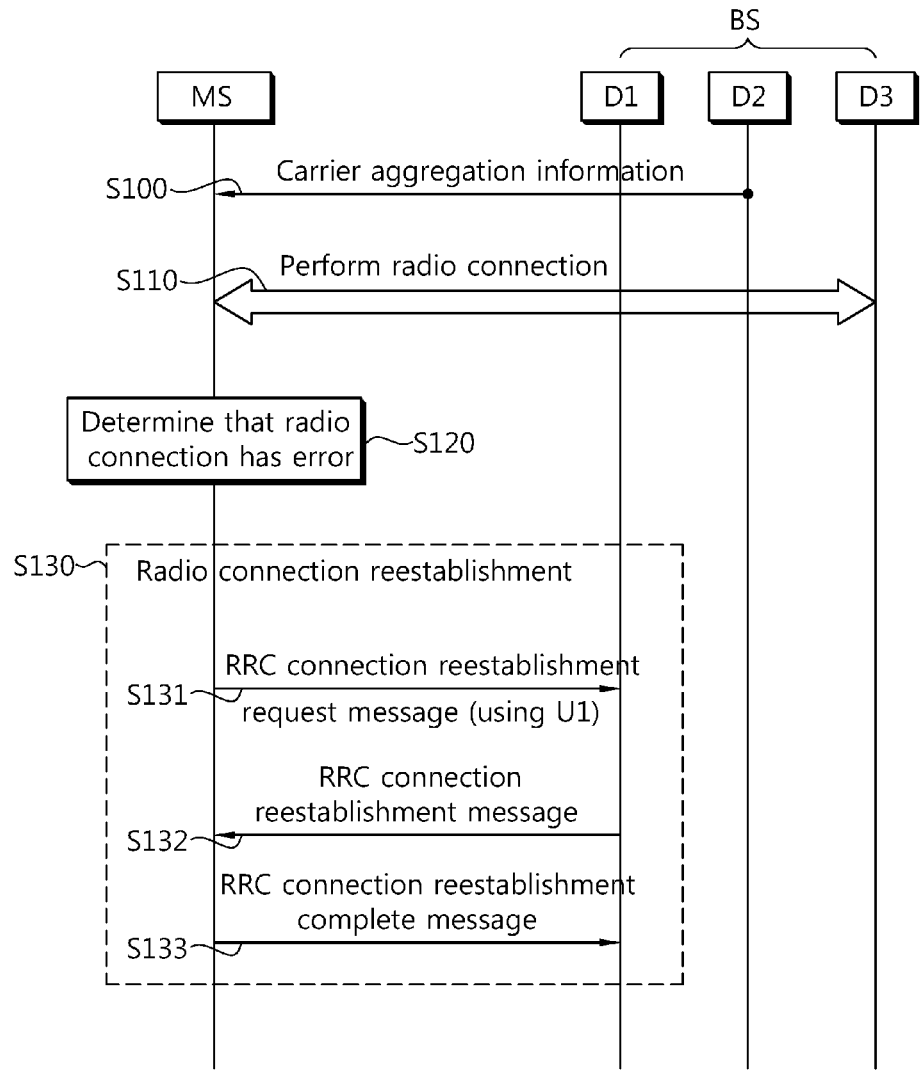
FIG. 5 is a flow chart illustrating a method of configuring a radio connection according to an exemplary embodiment of the present invention.

FIG. 5 is a flow chart illustrating a method of configuring a radio connection according to an exemplary embodiment of the present invention.

With reference to FIG. 5, the BS may perform communication with the MS by using downlink carriers D1, D2, and D3. D1, D2, and D3 are aggregated carriers. Each of the aggregated carriers is called a component carrier. The MS receives carrier aggregation information on a plurality of carriers aggregated through the downlink carrier D2 from the BS (S100). The carrier aggregation information refers to information on carriers the MS can use as a carrier set. Thus, the carrier aggregation information includes information on D1, D2, and D3. The carrier aggregation information may be received via a broadcast control channel (BCCH), a dedicated control channel (DCCH), or a common control channel (CCCH).

The MS performs radio accessing the BS by using a first carrier, at least one of the plurality of aggregated carriers (S110). Here, radio accessing refers to downlink reception by the MS from the BS or uplink transmission by the MS to the BS. Also, radio accessing may refer to camping on a particular carrier or a particular cell. Here, it is assumed that the first carrier is D2.

The MS determines whether there is an error in radio accessing or not (S120). An error of radio accessing may be called an RLF. The step S120 will be described in detail later with reference to FIG. 6. When there is an error in radio accessing using the first carrier D2, the MS needs to recover radio accessing because the MS has been receiving only D2 via downlink. Thus, the MS performs a procedure for recovering radio accessing with the BS, namely, an RRC connection reestablishment (S130). During the RRC connection reestablishment, a second carrier is used, which is different from the first carrier. There are several methods for selecting the second carrier, which will be described later. When D1 is determined as the second carrier, the MS may reestablish RRC connection by using the D1. The RRC connection reestablishment procedure is performed as follows: The MS transmits an RRC connection reestablishment request message to the BS (S131), receives an RRC connection reestablishment message (S132), and then transmits an RRC connection reestablishment complete message (S133). The RRC connection reestablishment request message and the RRC connection reestablishment complete message are transmitted via U1, an uplink carrier, which is mapped to the second carrier D1.

When the RLF occurs, the MS may select one of the remaining carriers, of the aggregated carriers excluding the currently connected carrier, and attempt radio access reestablishment using the selected carrier. Thus, the problem that a service being transmitted or received by the MS is delayed or interrupted due to the RLF can be solved.

Figure 6:
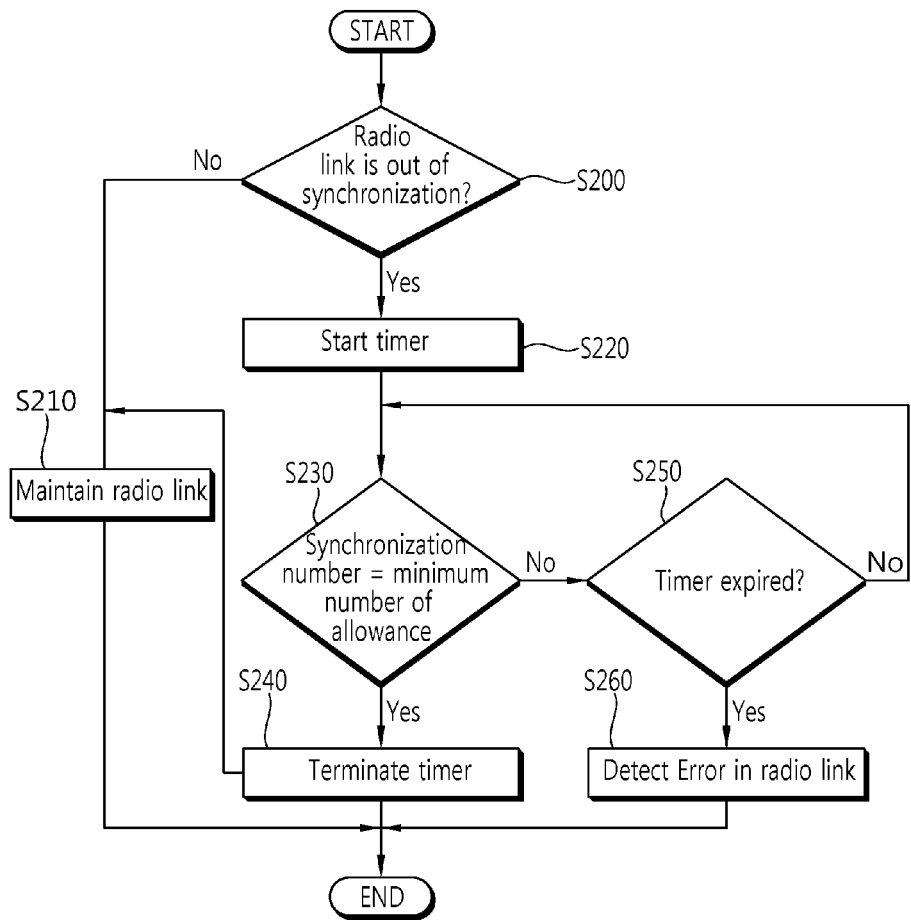
FIG. 6 is a flow chart illustrating the process of a method of determining an error of radio accessing according to an exemplary embodiment of the present invention.

FIG. 6 is a flow chart illustrating the process of a method of determining an error of radio accessing according to an exemplary embodiment of the present invention.

With reference to FIG. 6, the MS determines whether or not a radio link is out of synchronization (S200). When the radio link is out of synchronization, a physical layer of the MS informs an RRC layer that the radio is out of synchronization. In this case, when the physical layer informs the RRC layer about the out-of-synchronization of the radio link less than a maximum number of allowance (N310), the terminal maintains the radio link (S210). Meanwhile, if the physical layer informs the RRC layer about the out-of-synchronization of the radio link being as many as the maximum number of allowance (N310), the RRC layer starts a timer (T310) (S220).

While the timer is being driven, it is determined whether or not the physical layer of the MS informs whether or not the radio link is in synchronization by a minimum number of requirement (N311) (S230). If the physical layer of the MS informs that the radio link is in synchronization by the minimum number of requirement, the terminal terminates the timer (S440) and maintains the radio link (S210).

Meanwhile, when the physical layer of the MS does not inform by the minimum number of requirement, the MS determines whether or not the timer has expired (S250). If the timer expires, the MS detects an error of the radio link (s260) and declares an RLF. When the RLF is declared, the RRC layer of the MS performs cell selection to select a quality cell, and performs the RRC connection reestablishment procedure.

If the timer has not expired, it is determined if the physical layer of the MS informs whether or not the radio link is in synchronization by the minimum number of requirement (S230).

When an RLF occurs, the MS should be disconnected from the existing first carrier and configure a new second carrier. In this case, a reference for selecting the second carrier must be defined. Such reference will now be described.

In an embodiment, the second carrier is determined based on priority. Information on priority ranking which may be included in the carrier aggregation information. The priority ranking defines which carrier of the aggregated carriers is selected first for use in reestablishing radio connection. For example, it is assumed that priority of the carriers D1, D2, and D3 are D1>D2>D3. Here, x>y means that x has a higher priority than y. If a radio access error occurs in the carrier D2, the MS determines which of the remaining carriers D1 and D3 the MS should attempt a radio connection to, and in this case, because D1 has a higher priority, the MS attempts re-configuration of a radio connection by using the uplink carrier U1 mapped to the carrier D1.

The priority levels are determined according to a channel state of each carrier. For example, channel states of the respective carriers are compared, and the carriers may be given priority levels in the order, starting from a carrier having the best channel state being given the highest priority level. Among an aggregated carrier and a non-aggregated carrier, the aggregated carrier has a high priority level than the non-aggregated carrier. The non-aggregated carrier refers to a carrier that does not belong to the aggregated carriers. When there is a non-aggregated carrier D4, if all the radio connections of the aggregated carriers D1, D2, and D3 fail, the MS attempts reestablishment of a radio connection by using the non-aggregated carrier D4.

In another embodiment, the second carrier is randomly determined. For example, when an error occurs in the radio connection while the MS is camping in the carrier D2, among the aggregated carriers D1, D2, and D3, the MS reestablishes the radio connection by using an arbitrarily determined carrier among the remaining aggregated carriers D1 and D3.

Figure 7:
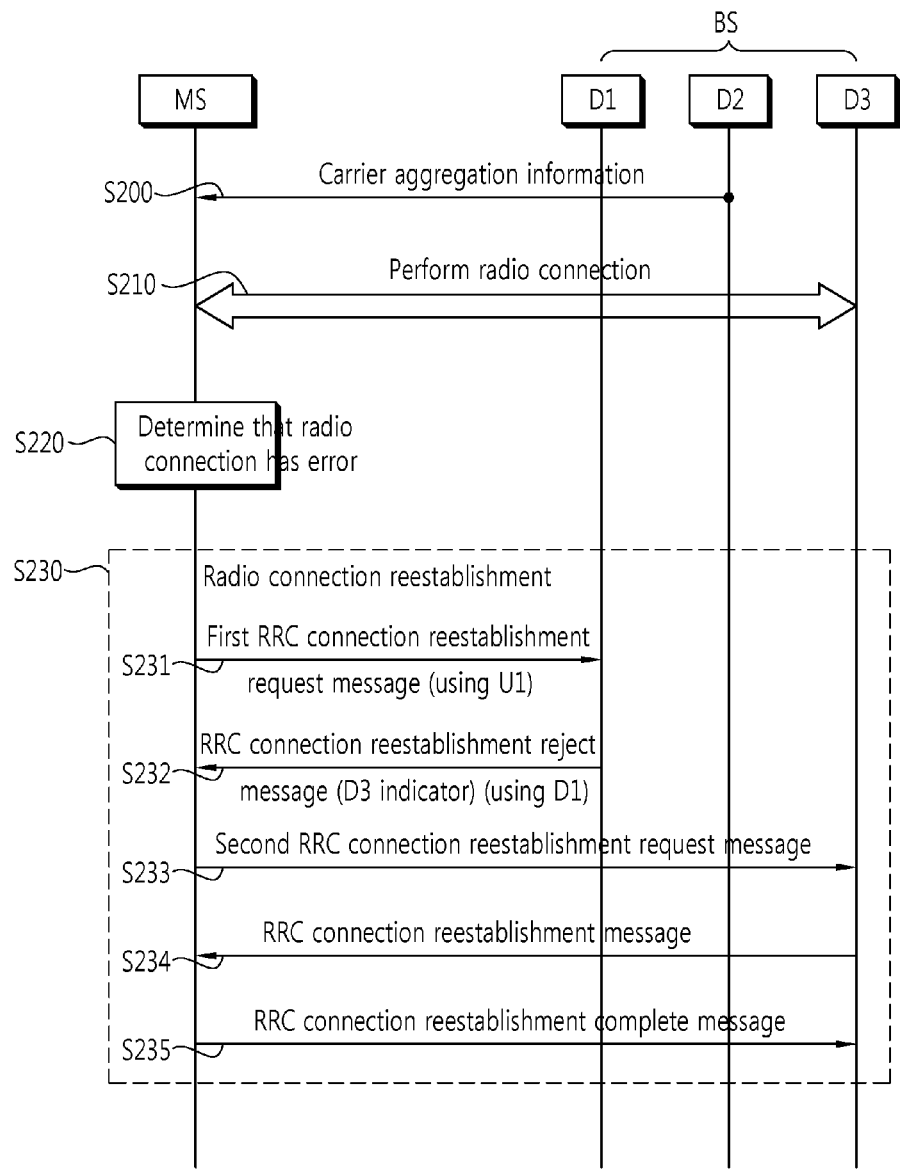
FIG. 7 is a flow chart illustrating the process of a method for configuring a radio connection according to another exemplary embodiment of the present invention.

FIG. 7 is a flow chart illustrating the process of a method for configuring a radio connection according to another exemplary embodiment of the present invention.

With reference to FIG. 7, steps S200 to S220 are the same as the steps S100 to S120, so a description thereof will be omitted. When an error of a radio connection through the carrier D2 is detected, the MS reestablishes the radio connection by using the new carrier D1 and the uplink carrier U1 mapped to the carrier D1 (S230). At this time, the MS first transmits a first RRC connection reestablishment request message to the BS (S231). In this case, the BS may transmit an RRC connection reestablishment reject message, which rejects the request of the RRC connection reestablishment, to the MS in a certain situation (S232). For example, when the carrier D1 is short of radio resource, the BS may reject the RRC connection reestablishment request message from the MS. In case of an RLF, the BS may transmit the RRC connection reestablishment reject message via the carrier D1.

In an embodiment, the RRC connection reestablishment reject message may include a D3 indicator indicating the carrier D3 having a lower priority level via which the MS is to transmit the RRC connection reestablishment request message, and include carrier information on the carrier D3. In this case, the MS transmits the RRC connection reestablishment request message to the BS by using the carrier D3 and an uplink carrier U3 mapped to the carrier D3 (S233).

In another embodiment, the RRC connection reestablishment reject message simply indicates that an RRC connection reestablishment of the MS using the carrier D1 is rejected. Thus, it does not include an indicator indicating a carrier. In this case, the terminal may enter an idle mode, or transmits the RRC connection reestablishment request message by using a carrier according to priority among the remaining carriers, excluding the carrier D2 by which a radio connection has failed and the rejected carrier D1, or randomly (S233).

The BS transmits a second RRC connection reestablishment message by using the carrier D3 to the MS (S234). In response, the MS transmits an RRC connection reestablishment complete message to the BS by using the uplink carrier U3 (S235). If the BS rejects the connection reestablishment request from the MS and transmits a second RRC connection reestablishment reject message, because it is not possible to reestablish an RRC connection via the aggregated carriers D1, D2, and D3, so the MS may attempt the RRC connection reestablishment process via a non-aggregated carrier. Namely, when a reestablishment of an RRC connection to every carrier belonging to the carrier aggregation information is not possible, the MS attempts the process of reestablishing an RRC connection via a carrier not included in the carrier aggregation information (not shown). When reestablishment of an RRC connection is completed, the MS and the BS perform radio connection by using the reestablished carrier.

In a further embodiment of the invention the selected second carrier from the group of aggregated carriers may be used to signal a RLF report for reporting failure of the radio link to the base station. In such a case the second carrier may or may not be used also fro re-establishing the radio connection.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

All functions described above may be performed by a processor such as a micro-processor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of establishing a radio link connection by a mobile station (MS) in a multi-carrier system supporting a carrier aggregation scheme, the method comprising:
   receiving, by the MS, carrier aggregation information defining a plurality of aggregated carriers;
   performing, by the MS, a radio link connection to a base station (BS) by using a first carrier among the plurality of aggregated carriers;
   determining, by the MS, whether there is an error on the radio link connection using the first carrier; and
   transmitting, by the MS, a signaling to the BS by using a second carrier when it is determined that the radio link connection has the error,
   wherein the second carrier is determined among the plurality of aggregated carriers based on a priority ranking,
   wherein the signaling is a radio link failure (RLF) signaling that reports a failure of the radio link connection to BS, and
   wherein the priority ranking is determined based on a channel state of each carrier among the aggregated carriers.

2. The method of claim 1, wherein transmitting the signaling is for reestablishing a radio connection via the second carrier.

3. The method of claim 1, wherein the carrier aggregation information comprises information on the priority.

4. The method of claim 1, wherein the carrier aggregation information is received via one of a broadcast control channel (BCCH), a dedicated control channel (DCCH) or a common control channel (CCCH).

5. The method of claim 2, wherein the reestablishing of the radio connection comprises:
   Transmitting the signaling, which is a radio resource control (RRC) connection reestablishment request message, to the BS;
   receiving an RRC connection reestablishment message from the BS; and
   transmitting an RRC connection reestablishment complete message to the BS.

6. The method of claim 5, wherein the RRC connection reestablishment request message is transmitted via the second carrier which is an uplink carrier.

7. The method of claim 5, wherein the RRC connection reestablishment request message comprises an indicator indicating the second carrier.

8. A user equipment for establishing a radio link connection to a base station in a multi-carrier system supporting a carrier aggregation scheme, the user equipment comprising:
   a transceiver for receiving carrier aggregation information defining a plurality of aggregated carriers;
   a processor for performing a radio link connection to a base station (BS) by using a first carrier among the plurality of aggregated carriers, and for determining whether there is an error on the radio link connection using the first carrier; and
   a transmitter being operable to transmit a signaling to the BS by using a second carrier when it is determined that the radio link connection has the error,
   wherein the second carrier is determined from among the plurality of aggregated carriers based on a priority ranking,
   wherein the signaling is a radio link failure (RLF) signaling that reports a failure of the radio link connection to BS, and
   wherein the priority ranking is determined based on a channel state of each carrier among the aggregated carriers.

* * * * *